US011487250B2

(12) United States Patent
Gupta et al.

(10) Patent No.: US 11,487,250 B2
(45) Date of Patent: Nov. 1, 2022

(54) WEARABLE DEVICE WITH A BEZEL TO SENSE A TOUCH INPUT

(71) Applicant: Samsung Electronics Co., Ltd., Suwon-si (KR)

(72) Inventors: Gaurav Gupta, Bangalore (IN); Abhishek Jatram, Bangalore (IN); Karimulla Shaik, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 16/712,073

(22) Filed: Dec. 12, 2019

(65) Prior Publication Data

US 2020/0218205 A1 Jul. 9, 2020

(30) Foreign Application Priority Data

Dec. 12, 2018 (IN) .............................. 201811047077
Nov. 20, 2019 (IN) .............................. 201811047077

(51) Int. Cl.
*G04G 21/08* (2010.01)
*G04G 17/02* (2006.01)
*G04G 17/08* (2006.01)

(52) U.S. Cl.
CPC .............. *G04G 21/08* (2013.01); *G04G 17/02* (2013.01); *G04G 17/08* (2013.01)

(58) Field of Classification Search
CPC ........ G04G 21/08; G04G 17/02; G04G 17/08; G06F 3/0445
USPC ........................................................ 368/295
See application file for complete search history.

(56) References Cited

U.S. PATENT DOCUMENTS

| 8,328,415 | B2 | 12/2012 | Kachi et al. |
| 9,727,029 | B2* | 8/2017 | Fujisawa ................. G04R 60/08 |
| 2015/0331589 | A1* | 11/2015 | Kawakita ................ G06F 21/31 |
| | | | 715/834 |
| 2015/0370376 | A1 | 12/2015 | Harley et al. |
| 2016/0124601 | A1* | 5/2016 | Hsiao ................. G06F 3/041662 |
| | | | 345/173 |
| 2017/0336964 | A1 | 11/2017 | Kim et al. |
| 2018/0088724 | A1* | 3/2018 | Erentok ................... G06F 3/041 |
| 2018/0217682 | A1 | 8/2018 | Dangy Caye |
| 2019/0113889 | A1* | 4/2019 | Kumar ................... G04G 21/00 |

FOREIGN PATENT DOCUMENTS

| EP | 3 032 360 A1 | 6/2016 | |
| EP | 3032360 A1 * | 6/2016 | ........... G04B 19/283 |
| WO | 2016/008346 A1 | 1/2016 | |
| WO | 2016/072823 A2 | 5/2016 | |
| WO | WO-2016072823 A2 * | 5/2016 | ............. G06F 3/041 |

OTHER PUBLICATIONS

European Search Report dated Nov. 10, 2021, issued in European Application No. 19897238.2.
International Search Report dated Mar. 30, 2020, issued in International Application No. PCT/KR2019/017627.

* cited by examiner

*Primary Examiner* — Edwin A. Leon
*Assistant Examiner* — Kevin Andrew Johnston
(74) *Attorney, Agent, or Firm* — Jefferson IP Law, LLP

(57) ABSTRACT

An electronic device is provided. The electronic device includes a bezel as a first metallic component, a dial as a second metallic component to form a capacitor with the bezel, an inner ring as a dielectric disposed between the bezel and the dial, at least one processor configured to obtain a capacitance value generated by a touch input on the bezel.

17 Claims, 16 Drawing Sheets

Bezel 207
(First Electrode)

Dial 204
(Second Electrode)

FIG.4J
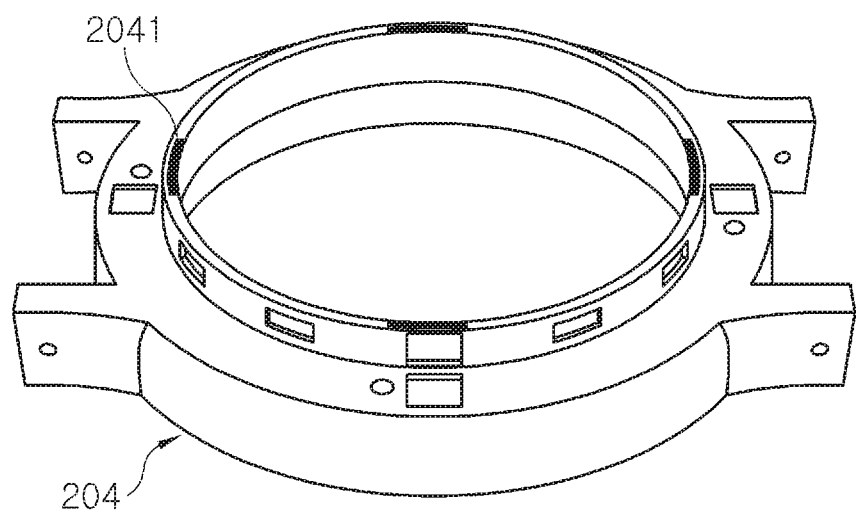
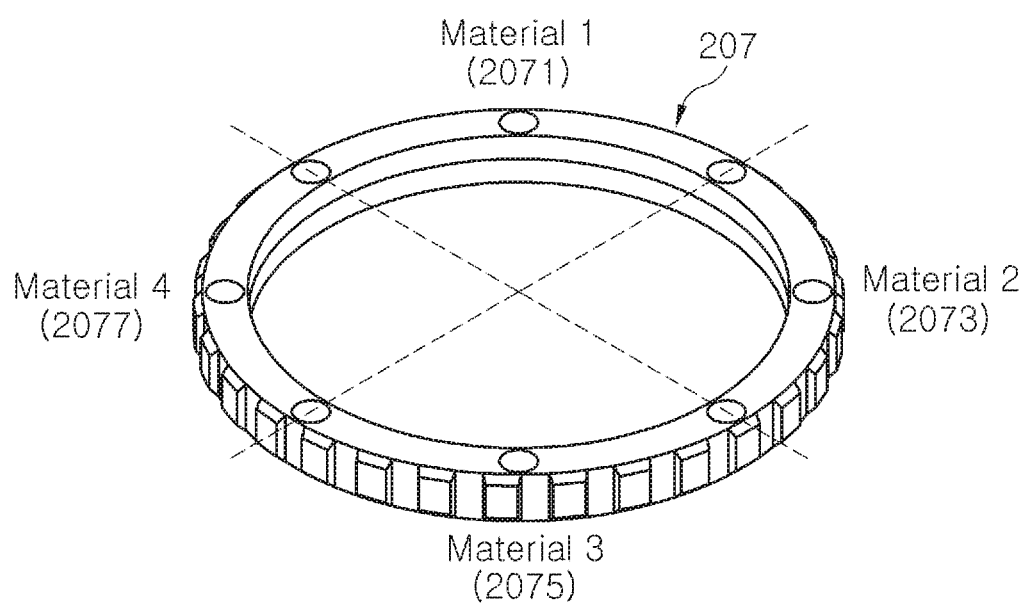

FIG.5B
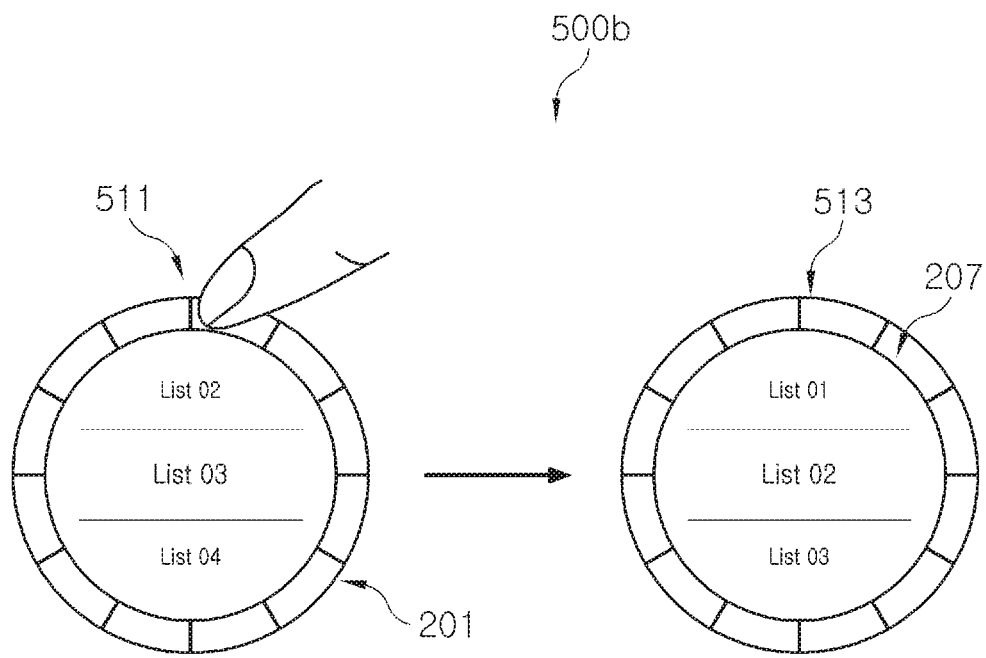
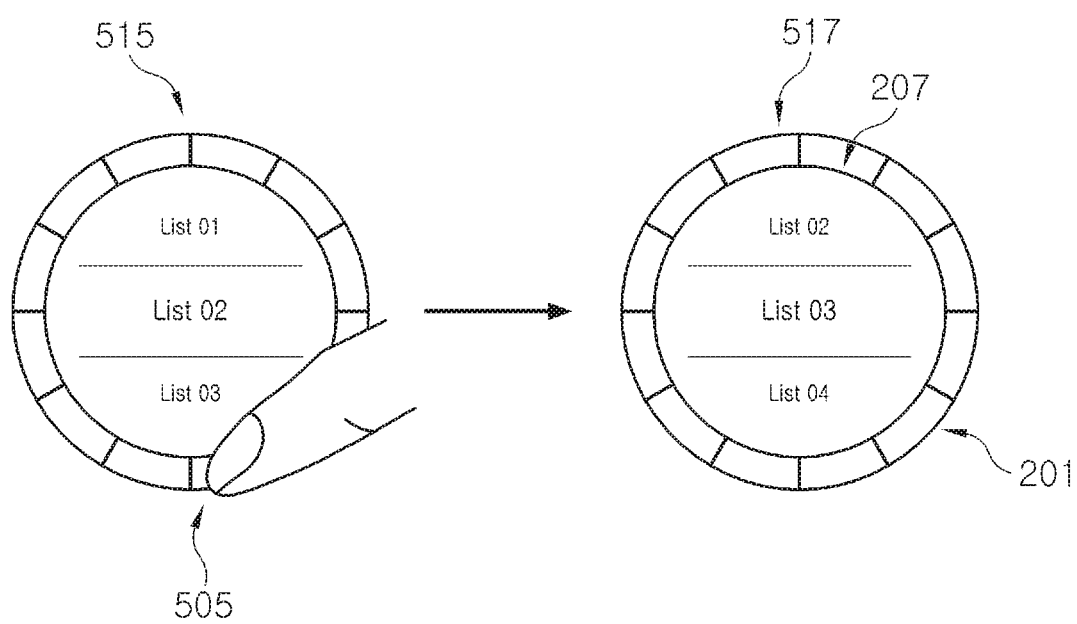

WEARABLE DEVICE WITH A BEZEL TO SENSE A TOUCH INPUT

CROSS-REFERENCE TO RELATED APPLICATION(S)

This application is based on and claims priority under 35 U.S.C. § 119(a) of an Indian Provisional application number 201811047077 (PS), filed on Dec. 12, 2018, in the Indian Intellectual Property Office, and of an Indian Complete application number 201811047077 (CS), filed on Nov. 20, 2019, in the Indian Intellectual Property Office, the disclosure of each of which is incorporated by reference herein in its entirety.

BACKGROUND

1. Field

The disclosure relates to detecting or sensing touch inputs on an electronic device without using pressure sensors and/or mechanical buttons.

2. Description of Related Art

Advancement in technology has resulted in a variety of electronic devices being introduced in the market in the last couple of decades. These devices pertain to all spheres of life and are used by individuals for different tasks and needs. The spectrum of these devices is quite wide in terms of applications. For instance, the devices, such as smart-glasses or smart spectacles provide a user real-time experiences about the environment. In addition, the devices, such as drones provide logistics and/or surveillance operations. Another example of an electronic device which has gained popularity in recent times is a smartwatch.

Most of the aforementioned devices support a touch-based interface. For example, a user provides a touch input to perform operations at the device. The touch input and operations responding thereto is typically realized by means of pressure sensors and/or mechanical buttons. The implementation of the pressure sensors and/or mechanical buttons may be cumbersome, complex, or challenging.

For instance, it is important on marketing aspect to achieve a compact and lightweight product for these devices. However, the inclusion of pressure sensors and/or mechanical buttons may require design complexities. Furthermore, implementation of pressure sensors may be challenging to the design of end products and may cost a lot for the manufacturers.

Also, implementation of the mechanical buttons may not suffice for complete operation of such devices. If take, for instance, an example of a smartwatch operated through a bezel, a mechanical bezel is provided on smartwatches to select control action icons. However, an additional touch input is required for selection of a control action icon, and thus resulting in additional installation of both the mechanical and/or pressure sensor to support the operation.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of providing a wearable device with a bezel.

Additional aspects will be set forth in part in the description which follows and, in part, will be apparent from the description, or may be learned by practice of the presented embodiments.

In accordance with an aspect of the disclosure, a method of detecting a touch input on a wearable device is provided. The method includes detecting a touch input on a bezel based on a capacitance value generated from a capacitor formed between the bezel, an inner ring and a dial of the wearable device, determining a location among a plurality of regions in the bezel, and performing an action corresponding to the determined location among the plurality of regions in the bezel, wherein the bezel corresponds to a first conductor, the dial corresponds to a second conductor, and the inner ring corresponds to a dielectric in the capacitor.

In accordance with another aspect of the disclosure, an electronic device is provided. The electronic device may be a wearable device and the wearable device includes a bezel as a first metallic component, a dial as a second metallic component to form a capacitor with the bezel, an inner ring as a dielectric disposed between the bezel and the dial, at least one processor configured to obtain a capacitance value generated by a touch input on the bezel.

In an embodiment of the disclosure, the wearable device is a watch-type electronic device and the bezel, the dial, and the inner ring are round-shaped.

In an embodiment of the disclosure, at least one of the bezel, the dial, or the inner ring has non-uniform thickness to generate different capacitance values in response to the touch input on the bezel.

In an embodiment of the disclosure, the at least one processor is configured to determine a location of the touch input based on the non-uniform thickness of at least one of the bezel, the dial, or the inner ring.

In an embodiment of the disclosure, the inner ring comprises a plurality of segments each of which is made of different materials.

In an embodiment of the disclosure, the at least one processor is configured to determine a location of the touch input based on the plurality of segments of the inner ring.

In an embodiment of the disclosure, the at least one processor is configured to assign a function corresponding to the location of the touch input.

In an embodiment of the disclosure, the bezel comprises a plurality of segments each of which corresponds to each of the plurality of segments of the inner ring.

In an embodiment of the disclosure, the wearable device further includes a display and the at least one processor is configured to display, on the display, a plurality of applications of which location correspond to the location of each of the plurality of segments of the bezel.

In an embodiment of the disclosure, the at least one processor is configured to highlight an application among the plurality of applications in response to the touch input on a segment of the bezel which corresponds to the application.

In an embodiment of the disclosure, the highlighting of the application comprises enlarging an icon of the application.

In an embodiment of the disclosure, the at least one processor is configured to execute the application based on a second touch input on the segment of the bezel corresponding to the application.

In an embodiment of the disclosure, the at least one processor is configured to control a scrolling operation with a list of data displayed on a display of the wearable device based on the touch input on a segment of the bezel.

In an embodiment of the disclosure, each of the plurality of segments of the bezel comprises a numeric character or an alphabet character to be selected by the touch input on the bezel.

In an embodiment of the disclosure, the at least one processor is configured to display, on a display of the wearable device, the numeric character or the alphabet character based on the touch input on a corresponding segment of the bezel.

In an embodiment of the disclosure, the bezel includes a plurality of segments each of which is made of different materials.

In an embodiment of the disclosure, the at least one processor is configured to determine a location of the touch input based on the plurality of segments of the bezel.

In an embodiment of the disclosure, the at least one processor is configured to assign a function corresponding to the location of the touch input.

In an embodiment of the disclosure, the bezel, the dial, and the inner ring are at least one of square-shaped, rectangular-shaped or ellipse-shaped.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4J illustrates components of a watch-type electronic device according to an embodiment of the disclosure;

FIG. 5B illustrates another operation with a wearable device according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments of the disclosure will be described below in detail with reference to the accompanying drawings.

Figure 1:
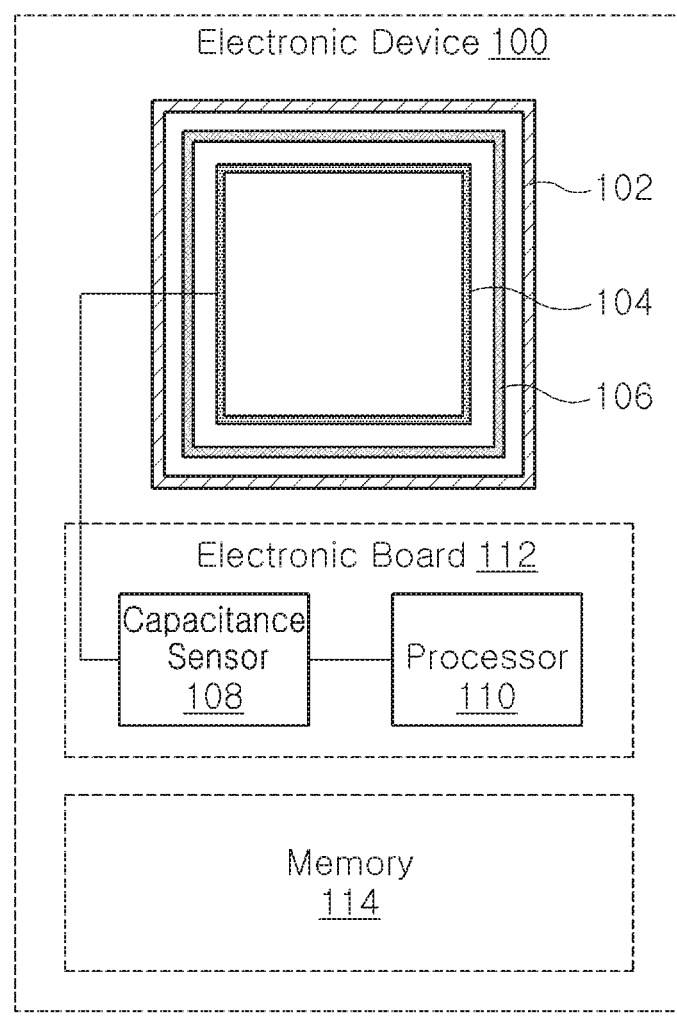
FIG. 1 illustrates a block diagram of an electronic device according to an embodiment of the disclosure.

FIG. 1 illustrates a block diagram of an electronic device according to an embodiment of the disclosure.

Referring to FIG. 1, an electronic device 100 may be, but are not limited to, a smart phone, a smart watch, a smart TV, a smart-spectacle, home appliances a smart-washing machine, a smart-microwave, an electrical lamp, a virtual reality (VR) device or a drone. According to an embodiment of the disclosure, the electronic device 100 may include a first metallic component 102, a second metallic component 104, and a third component 106. The first metallic component 102 and the second metallic component 104 may be made of any metal or an alloy derived out of combination of one or more metals. The third component 106 may be made of one or more dielectric materials, such as porcelain (ceramic), mica, glass, plastics, and oxides of various metals. In an example, the third component may be made of a single dielectric material and may have a uniform thickness. In another example, the third component 106 may be made of a single dielectric material and may have non-uniform thickness. In yet another example, the third component 106 may be made of one or more of dielectric materials and may have uniform/non-uniform thickness.

According to an embodiment of the disclosure, the third component 106 may be disposed between the first metallic component 102 and the second metallic component 104 to emulate a capacitor arrangement where a first capacitance is developed between the first metallic component 102 and the second metallic component 104. In the embodiment of the disclosure, the third component 106 may be disposed such that an air gap exists between the first metallic component 102, the third component 106, and the second metallic component 104, and a uniform capacitance may exist between the first metallic component 102 and the second metallic component 104. However, in another embodiment of the disclosure, no air gap may exist between the first metallic component 102, the third component 106, and the second metallic component 104. For instance, a user interaction of 'pressing' a button or a touch sensitive display of an electronic device may require a gap between the first metallic component 102, the third component 106, and the second metallic component 104. In another example, a user interaction of 'hover' and/or touch' may not require an air gap between the first metallic component 102, the third component 106, and the second metallic component 104.

As the capacitance is now developed according to the aforementioned arrangement, user inputs provided by the user may be detected without specific pressure sensors and/or mechanical buttons. Thus, the implementation of pressure sensors and/or mechanical buttons in the electronic device 100 may no longer be required.

In an embodiment of the disclosure, the electronic device 100 may further include an electronic board 112, which may include a capacitance sensor 108 and a processor 110. The capacitance sensor 108 may be electrically coupled to the second metallic component 104 and may be configured to output a value of the capacitance existing between the first metallic component 102 and the second metallic component 104. As may be understood, when no interference with respect to the developed capacitance, i.e., the first capacitance, occurs, the capacitance sensor 108 outputs a value of the first capacitance.

In an embodiment of the disclosure, the processor 110 may be electrically coupled to the capacitance sensor 108 and a memory 114. In an embodiment of the disclosure, the processor 110 may continuously detect the value of the capacitance existing between the first metallic component 102 and the second metallic component 104. When there is no disruption or interference in the first capacitance, the obtained value is equal to the value of the first capacitance. However, when a disruption or interference occurs in the first capacitance, for example, by a user input made on the first metallic component 102, the value of capacitance existing between the first metallic component 102 and the second metallic component 104 may be changed to a value of a second capacitance. The processor 110 may control the memory 114 to store data.

As the processor 110 is continuously obtaining or detecting the value of the capacitance from the capacitance sensor 108, the processor 110 may detect a change of the capacitance from the first capacitance to the second capacitance. Subsequently, the processor 110 may determine a type of the user input based on the value of the second capacitance. The type of user input may include, but are not limited to, a hover input, a touch input, a push input, a drag input, a tapping input, and a long press input.

In an example, to determine the type of user input, the processor 110 may obtain the value of the second capacitance. Based on the second capacitance, the processor 110 may then determine a length of a body part of a user providing the user input with respect to the first metallic component 102. Generally, the body part of the user may be a part of a finger of the user. In an example, for determining the length of the body part based on the second capacitance, the processor 110 may ascertain a magnitude of the change in capacitance based on the user's input. In an example, the processor 110 may detect the magnitude of the change in the capacitance by subtracting the value of the second capacitance from the value of the first capacitance. Once the magnitude of the change is determined, the processor 110 may access a magnitude-length mapping table stored in a database of the electronic device 100 or of a remote server, for determining the length of the body part. The magnitude-length mapping table may include a mapping between a plurality of capacitance values, a plurality of lengths, and a type of user input. An magnitude-length mapping table is shown in Table 1 below.

TABLE 1

| Magnitude of change in capacitance (in farad) | Length of the body part (for example, finger) | Type of User Input |
| --- | --- | --- |
| $A_0$-$A_1$ | $D_0$-$D_1$ | Hover |
| $A_2$-$A_3$ | $D_2$-$D_3$ | Touch |
| $A_4$-$A_5$ | $D_4$-$D_5$ | Push |

Based on the length of the body part, or the magnitude of changes in the capacitance, the processor 110 may then determine the type of user input. Thus, the processor 110 is configured to determine the type of user input as one of a touch input, a hover input, and a push input based on the distance of the body part, as explained above. For example, if the length of the body part is determined to be very short based on the magnitude of changes in the capacitance, the type of user input may be classified into a push input. If the length of the body part is determined to be relatively short based on the magnitude of changes in the capacitance, the type of user input may be classified into a touch input. If the length of the body part is determined to be long based on the magnitude of changes in the capacitance, the type of user input may be classified into a hover input.

In an embodiment of the disclosure, when the distance between the body part and the first metallic component 102 is constant for a predetermined time period, the processor 110 may determine the type of user input as a long press input.

In an embodiment of the disclosure, the processor 110 may active a user interface, for example, a display or a touch interface, of the electronic device 100 when the length of the body part is determined to be equal to or less than a predetermined value. Accordingly, the user may be provided with an access to various control options and functions of the electronic device 100 via the aforementioned touch interface.

A metallic bezel of the smartwatch may serve as the first metallic component 102 and a metallic housing or a metallic dial of the smartwatch may serve as the second metallic component 104. Furthermore, a dielectric ring therebetween may be provided in the smartwatch according to the aforementioned aspects and the dielectric ring may serve as the third component 106 and a dielectric existing between the two electrodes which are the metallic bezel and the metallic housing, respectively. As may be understood from the above, a capacitance is formed between the metallic bezel and the metallic housing with a dielectric—the dielectric ring—inserted therebetween.

When a user seeks to provide a touch input by moving his finger near the bezel of the smartwatch, the capacitance sensor 108 may output a change of the capacitance. The change of the capacitance occurs by the disruption in the capacitance by the user's finger. Based on the change of the capacitance, the processor 110 may determine the type of user input as one of a hover input, a touch input, a push input, and a long press input.

In an embodiment of the disclosure, a location of the user input may be also detected in the electronic device 100. In an embodiment of the disclosure, the third component 106 may be made or formed asymmetrically. Example of the dimension may include, but are not limited to, a width and a height. In an embodiment of the disclosure, the third component 106 may have a continuously varying width and/or a continuously varying height.

In an embodiment of the disclosure, the processor 110 may determine a location of the user input on a portion of the electronic device 100 based on the second capacitance, the first capacitance, and a predetermined mapping between a plurality of capacitance values formed between the first capacitance and the second capacitance. The location of the user input may be detected either on the first metallic component 102 or on the second metallic component 104. Generally, since the bezel is generally exposed to the user, the first metallic component 102, the location of the user input may be determined on the any of the first metallic component 102.

Table 2 illustrates the mapping between the plurality of capacitance values and the plurality of segments of the first metallic component 102.

TABLE 2

| Capacitance Values (Second Capacitance) | Segment of the first metallic component 102 |
|---|---|
| $C_0$-$C_1$ | $S_1$ |
| $C_2$-$C_3$ | $S_2$ |
| $C_4$-$C_5$ | $S_3$ |
| $C_6$-$C_7$ | $S_4$ |
| $C_8$-$C_9$ | $S_5$ |
| $C_{10}$-$C_{11}$ | $S_6$ |

As may be seen, on determining the second capacitance, the processor 110 may be configured to access the aforementioned mapping table. Based on the mapping table, the processor 110 may identify a range of capacitance values within which the second capacitance falls. Once the range is identified, the processor 110 may subsequently identify a segment of the first metallic component 102. According to Table 2, the first metallic component 102 are divided into six (6) segments each of which may occupy 60 degree around the bezel of the electronic device 100, respectively. The identified segment may be determined as the location of the user input on the first metallic component 102.

In an embodiment of the disclosure, when a continuous change in the location of the user input is detected, the processor 110 may determine the type of the user input as a slide gesture input. For instance, when the processor 110 determines that the value of the second capacitance various continuously from C0 to C5. Accordingly, the processor 110 may determine that the user input has moved from segment S1 to S3, and that the user input is a slide gesture input. In a further example embodiment of the disclosure, the processor 110 may be further configured to determine a direction of the slide gesture input based on the continuous change in the location. For instance, if the change of location is detected from Si to S3, the processor 110 may determine that the user input is moving in a clockwise or left to right direction. Accordingly, based on a predetermined mapping, the direction of the slide gesture input may be determined by the processor 110.

In another example embodiment of the disclosure, the processor 110 may perform a control operation based on the type of the user input and the location of the user input. By determining the magnitude of change, the processor 110 determines the type of input, and by determining the value of the second capacitance, the processor 110 detect the location of the user input. Accordingly, the processor 110 may perform a control operation based on the type of the user input and the location of the input.

For instance, the processor 110 may provide the identification of applications at least one of which the user may want to select based on the location of the user input. Further, the processor 110 provides for a selection of the application based on the type of user input.

In an embodiment of the disclosure, the electronic device 100 may be a wearable device, such as a smartwatch or a smart-spectacle. The first metallic component 102 is a metallic bezel, the second metallic component 104 is a metallic housing or a metallic dial, and the third component 106 is a dielectric ring. In the embodiment of the disclosure, the capacitance sensor 108 is electrically coupled to the second metallic component 104 using an electric wire. Other wired and/or wireless means of the connection may also be implemented for connecting the capacitance sensor 108 to the second metallic component 104.

Although not shown in FIG. 1, the electronic device 100 may also include a display for displaying various applications and their operations thereon.

Figure 2:
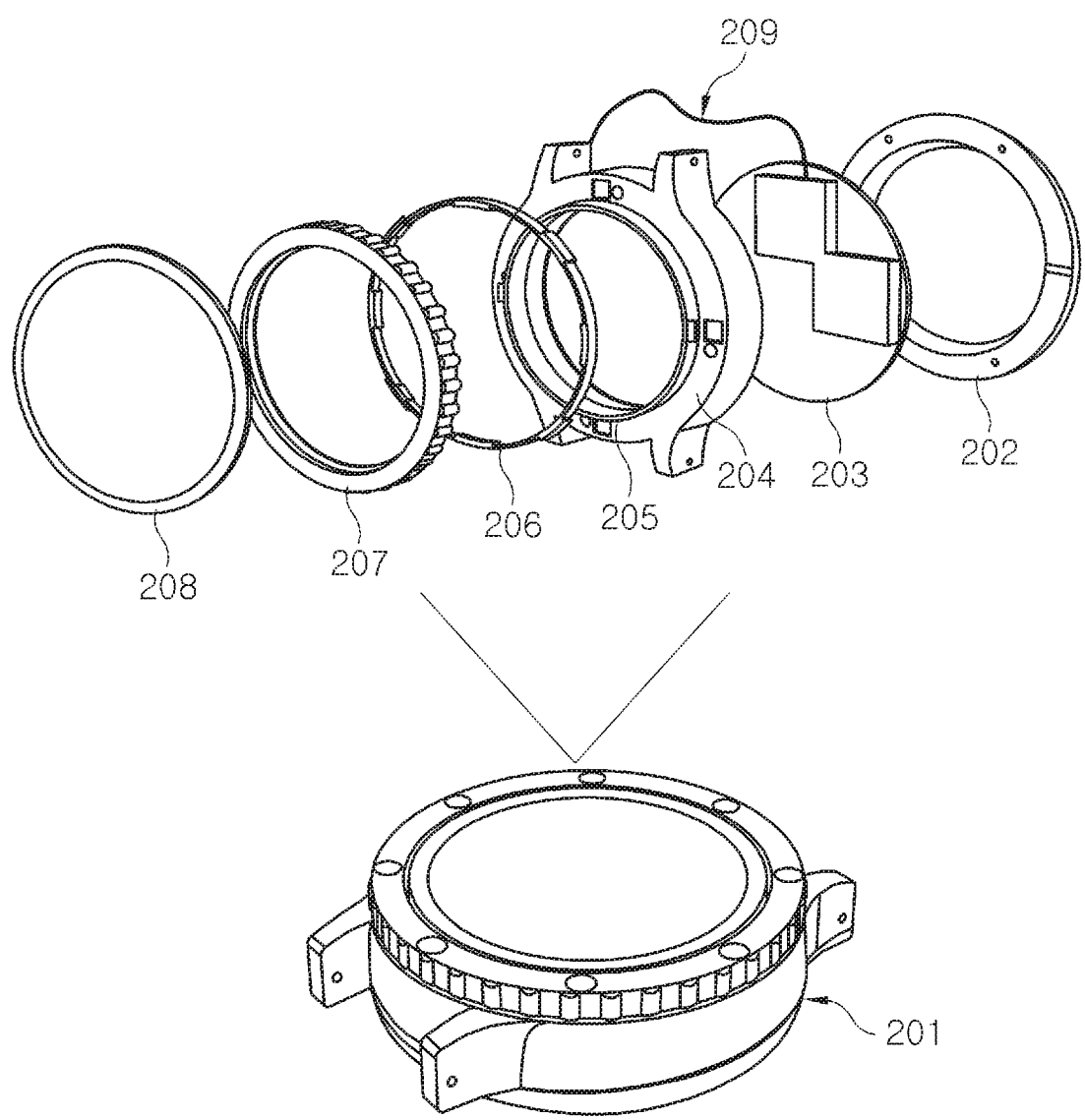
FIG. 2 illustrates an exploded view of a wearable device according to an embodiment of the disclosure.

FIG. 2 illustrates an exploded view of a wearable device, according to embodiments of the disclosure.

A watch-type electronic device 201 (hereinafter interchangeably referred to as "device 201") may include a rear case 202, a mainboard 203, a dial 204, a front case 205, an inner ring 206, a bezel 207, and a cover glass 208. In an example, the inner ring 206 may be discontinuous or may have variable thickness. Variable thickness of the inner ring 206 facilitates in detecting multiple touch points on the bezel. Furthermore, the inner ring 206 may include a plurality of crests. For example, the inner ring 206 may include one or more rectangular shaped crests on an inner surface or an outer surface thereof. The dial 204 may be electrically connected to a mainboard 203 to transmit the sensed capacitance value to the processor.

The front case 205 may be a component of the dial 204 and may be rested along proximal circular periphery of the dial 204. The front case 205 may include gaps at regular intervals that can fit the rectangular shaped crests provided on the inner surface of the inner ring 206. Furthermore, the bezel 207 may be of discontinuous or variable thickness and may include horizontal groves on an inner surface or at inside rim of the bezel 207 that can fit rectangular shaped crests on the outer surface of the inner ring 206.

The device 201 may further include a printed circuit board (2001, PCB) positioned on the mainboard 203. The processor implemented on the mainboard 203 or the PCB 2001 may receive the changes in capacitance sensed by the capacitance sensor 108. Further, the dial 204 may be operably connected to the mainboard 203 or the PCB 2001 on the mainboard 203. In an embodiment of the disclosure, the operable connection between the dial 204 and the mainboard 203 may be made through a wire 209.

Figure 3A:
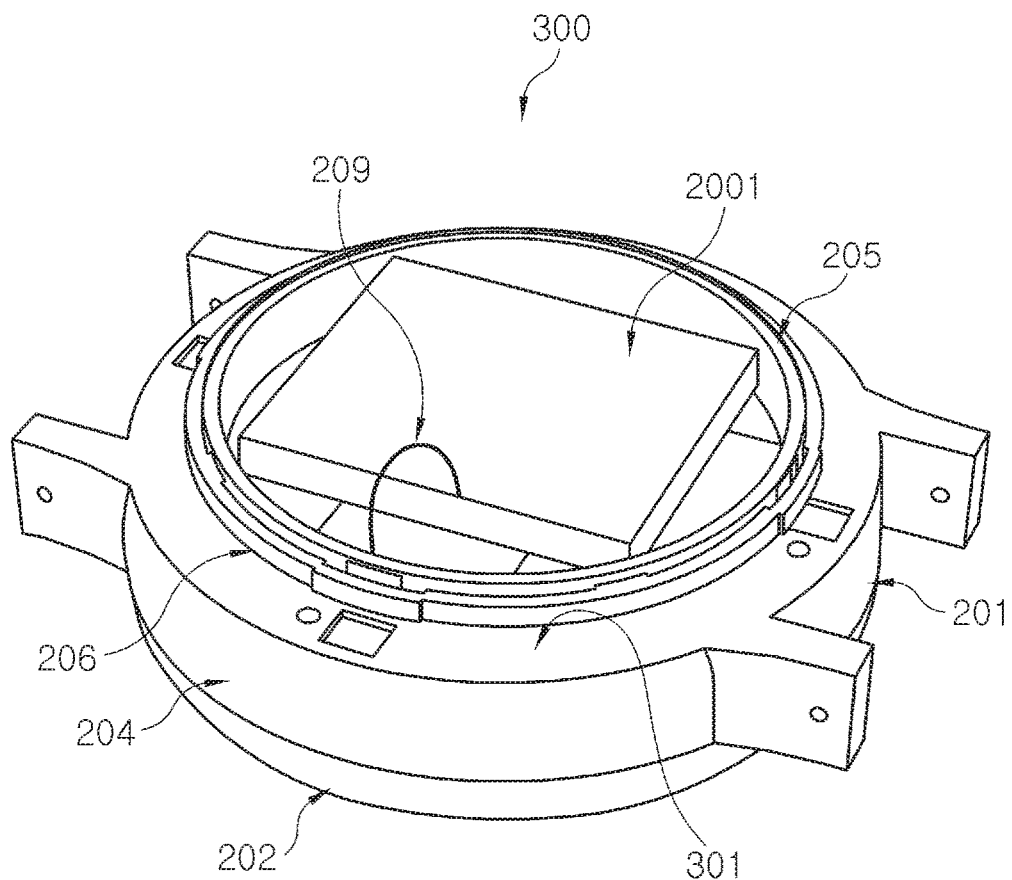
FIG. 3A illustrates an assembled view of a wearable device according to an embodiment of the disclosure.

FIG. 3A illustrates an assembled view of a wearable device according to an embodiment of the disclosure.

Referring to FIG. 3A, an assembled view 300 of the watch-type electronic device 201 is illustrated. In an embodiment of the disclosure, the mainboard 203 (not shown in FIG. 3A) is mounted on the rear case 202. The mainboard 203 rests in between the dial 204, the front case 205, the inner ring 206 and the bezel 207 (not shown in FIG. 3A). Further, the cover glass 208 (not shown in FIG. 3A) may be mounted on the front case 205.

The inner ring 206 is positioned over the dial 204, thereby encircling the front case 205. The bezel 207 is mounted over the dial 204 and the front case 205 such that an air gap may be maintained between the bezel 207 and the inner ring 206. As shown in FIG. 3A, the PCB 2001 and/or the mainboard 203 are operably connected to the dial 204 through the electrical wire 209.

Figure 3B:
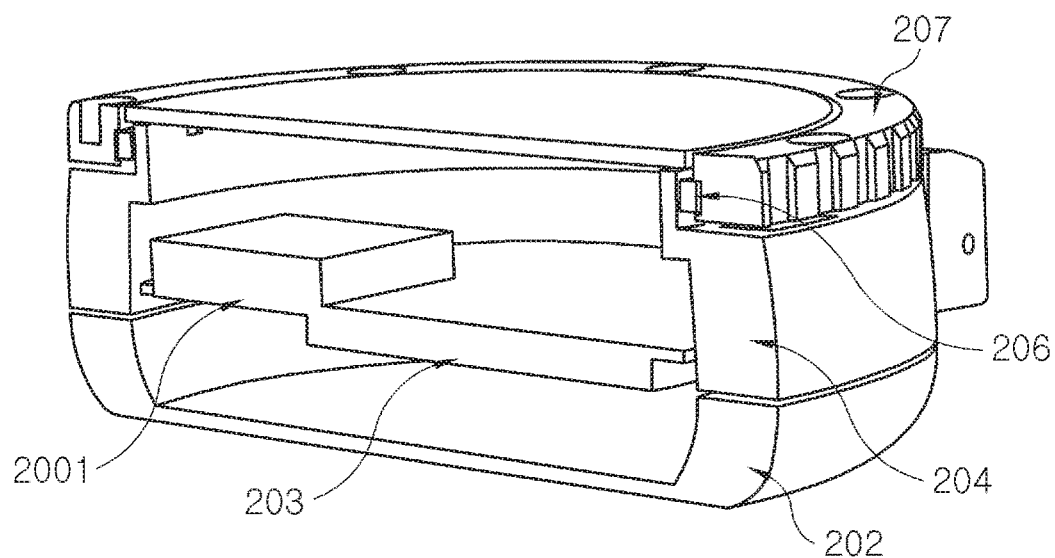
FIG. 3B illustrates a sectional view of a wearable device according to an embodiment of the disclosure.

FIG. 3B illustrates a sectional of a wearable device according to an embodiment of the disclosure.

Referring to FIG. 3B, the inner ring 206 serving as dielectric is disposed between the bezel 207 and the inner ring 206. The bezel 207 and the inner ring may serve as the first electrode and the second electrode, respectively, to form a capacitance. The mainboard 203 is implemented on the rear case 202.

Figure 4A:
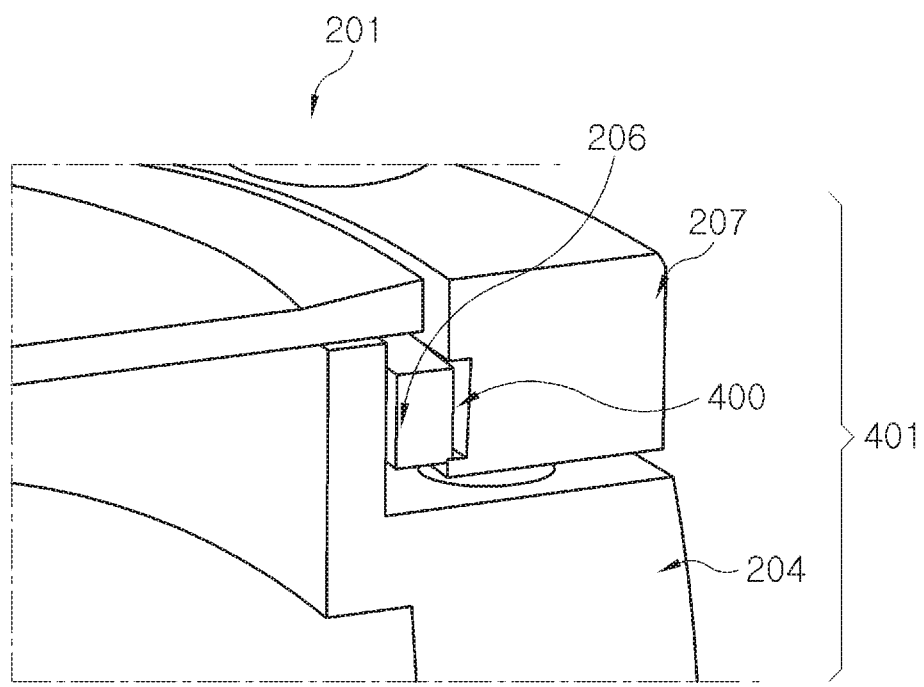
FIG. 4A illustrates a cross-sectional view of a wearable device according to an embodiment of the disclosure.

FIG. 4A illustrates a cross-sectional view of a wearable device according to an embodiment of the disclosure.

Referring to FIG. 4A, the dial 204, the inner ring 206, and the bezel 207 constitute sensing interface of the watch-type electronic device 201. In an embodiment of the disclosure, it is shown that horizontal groves at inside rim or inner surface of the bezel 207 are arranged with respect to the inner ring 206 to leave an air gap 400. As a result, the bezel 207, the dial 204, the inner ring 206 and the air gap 400 form a single capacitor 401. The bezel 207 becomes a first conductive plate, the front case 205 of the dial 204 becomes a second conductive plate, and the inner ring 206 becomes dielectric between the two electrodes. In another example, the bezel 207 is the first conductive plate and the dial 204 is the second conductive plate.

In an example, the dial 204 and the bezel 207 may be made of metals. Furthermore, in an example, the inner ring 206 may be made of plastic material. In another example, the inner ring 206 may be made from a number of segments each of which is made of different materials having different dielectric constants, respectively. For example, the inner ring 206 is divided into 6 segments with dielectric constant e0, e1, e2, e3, e4, e5, and e6, respectively.

Figure 4B:
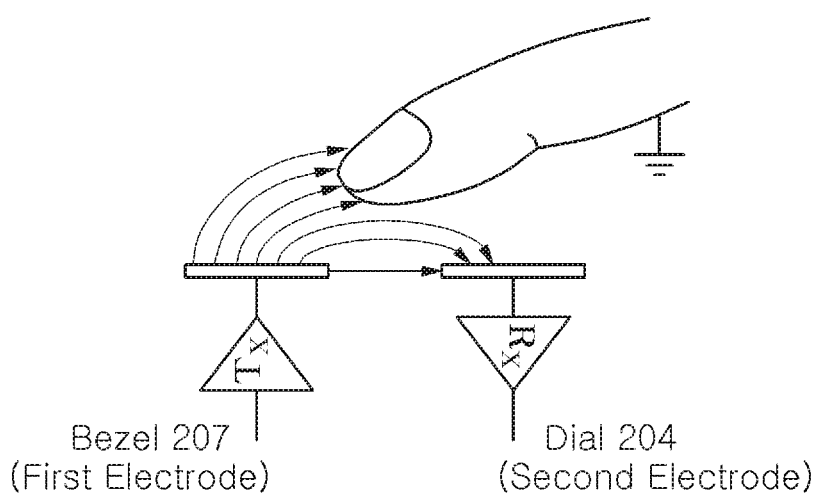
FIG. 4B illustrates an equivalent capacitance model of a cross-sectional structure of a wearable device according to an embodiment of the disclosure.

FIG. 4B illustrates an equivalent capacitance model of a cross-sectional structure of a wearable device according to an embodiment of the disclosure.

Referring to FIG. 4B, the equivalent capacitance model of the cross-sectional structure illustrated referring to FIG. 4A is depicted. The bezel 207 may act as a first electrode and the dial 204 may act as a second electrode to constitute a capacitance (Cm) 2005 to detect a touch input on the bezel 207.

Figure 4C:
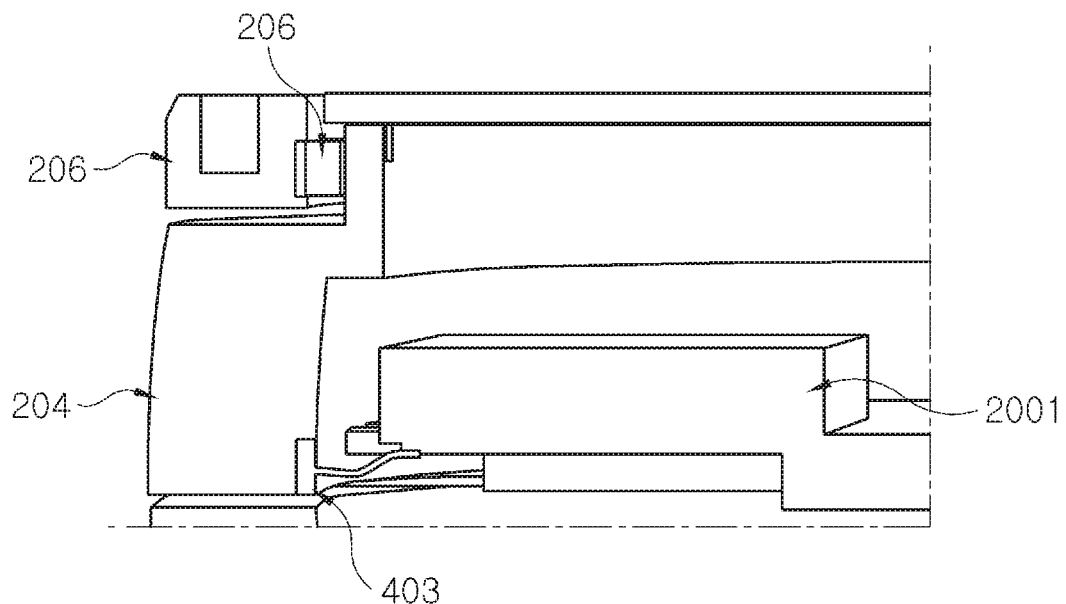
FIG. 4C illustrates a sectional view of a wearable device according to an embodiment of the disclosure.

FIG. 4C illustrates a sectional view of a wearable device according to an embodiment of the disclosure.

Referring to FIG. 4C, a single connection 403 is shown between the dial 204 and the mainboard 203. In particular, the PCB 2001 which is mounted on the mainboard 203 may be operably connected to the dial 204 with the single connection 403. As would be understood, changes in capacitance can be measured by operably connecting the dial 204 and the PCB 2001 through the single connection 403. The processor 110 may be mounted on the mainboard 203 or the PCB 2001.

In an operation, a user may make a contact with the bezel 207 of the watch-type electronic device 201. Examples of the contact include, without any limitation, a touch, a slide, a push, a squeeze, or any combination thereof. In another operation, the user may make contactless interaction with the bezel within a predetermined distance. Examples of making contactless interactions include, without any limitation, hover and tilt.

Figure 4D:
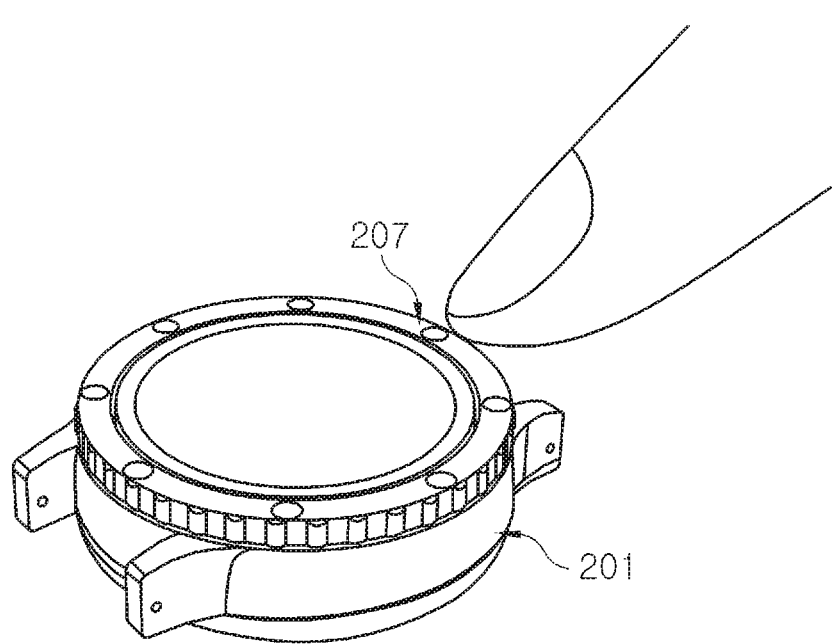
FIG. 4D illustrates a sensing interface of a wearable device according to an embodiment of the disclosure.

FIG. 4D illustrates a sensing interface of a wearable device according to an embodiment of the disclosure.

Referring to FIG. 4D, a user may touch the bezel 207 of the watch-type electronic device 201. In response, the processor 110 mounted on the mainboard 203 (not shown) may detect changes of capacitance at a capacitor formed at least with the bezel 207 and the dial 204 (not shown) and accordingly, an operation with the watch-type electronic device 201 can be determined. In an example, capacitance of parallel conductive plates may be measured by using equation:

$$C = \frac{\varepsilon A}{d} \qquad \text{Equation 1}$$

Here, C is the capacitance in Farads, c is the permittivity of dielectric (absolute, not relative), A is the area of plate overlap in square meters, and d is the distance between plates in meters. In an embodiment of the disclosure, c may be determined by the material of the inner ring 206 (not shown) and the A and d may be determined by the size and length of the bezel 207 and the dial 204. In an embodiment of the disclosure, segments (portions) of the inner ring 206, the bezel 207, and/or the dial 204 may be made of different materials and thus the capacitance value generated with the same touch input may result in different values for each of the segments. For example, the inner ring 206 may be divided into 4 segments with different dielectric materials having $\varepsilon 1$, $\varepsilon 2$, $\varepsilon 3$, and $\varepsilon 4$, respectively. Each region corresponding to each segment may have a different capacitance value than other regions for the electronic device to generate different functions or operations.

Figure 4E:
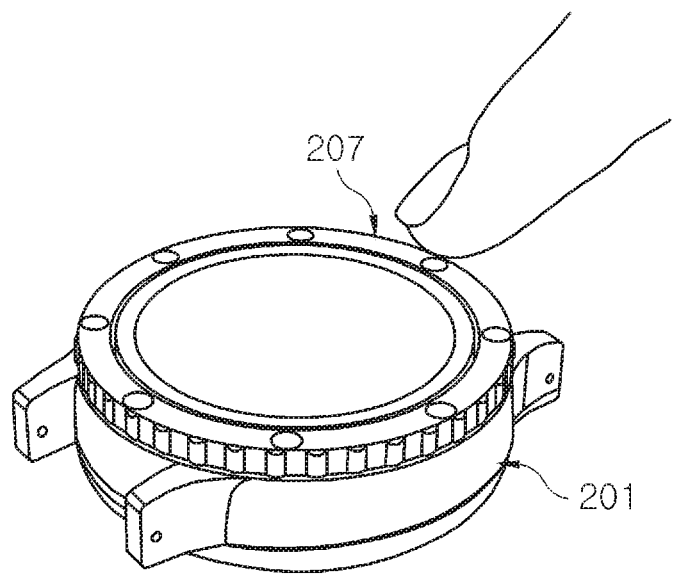
FIG. 4E illustrates a sensing interface of a wearable device according to an embodiment of the disclosure.

FIG. 4E illustrates a sensing interface of a wearable device according to an embodiment of the disclosure.

Referring to FIG. 4E, a user may push the bezel 207 of the watch-type electronic device 201. In the operation, the processor 110 may detect changes of capacitance value based on the push input on the bezel 207. The changes of capacitance value may occur in response to changes in the air gap 400 due to translation of the bezel 207 relative to the dial 204 as a result of the push by the user. In addition to the detecting of the changes of capacitance value, a location of the push input on the bezel 207 may also be detected based on the discontinuous or varied thickness of the inner ring 206. In an embodiment of the disclosure, The location of the push input on the bezel 207 may be detected based on the discontinuous or varied thickness of the bezel 207.

Figure 4F:
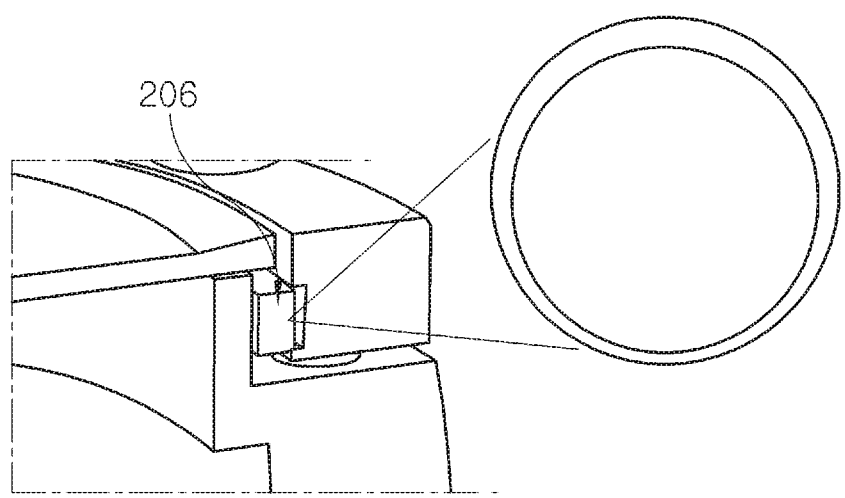
FIG. 4F illustrates a sensing interface of a wearable device according to an embodiment of the disclosure.

FIG. 4F illustrates a sensing interface of a wearable device according to an embodiment of the disclosure.

Referring to FIG. 4F, the inner ring 206 may or may not have uniform thickness. Referring to FIG. 4F, the inner ring 206 has varying thickness which may provide different capacitance values for different portions of the inner ring 206. Since the capacitance values may vary for each of different portions of the inner ring 206 due to the varying thickness, a corresponding location of the inner ring 206, and/or a corresponding location of the bezel 207 may be identified based on the different capacitance values for different portions of the inner ring 206.

Figure 4G:
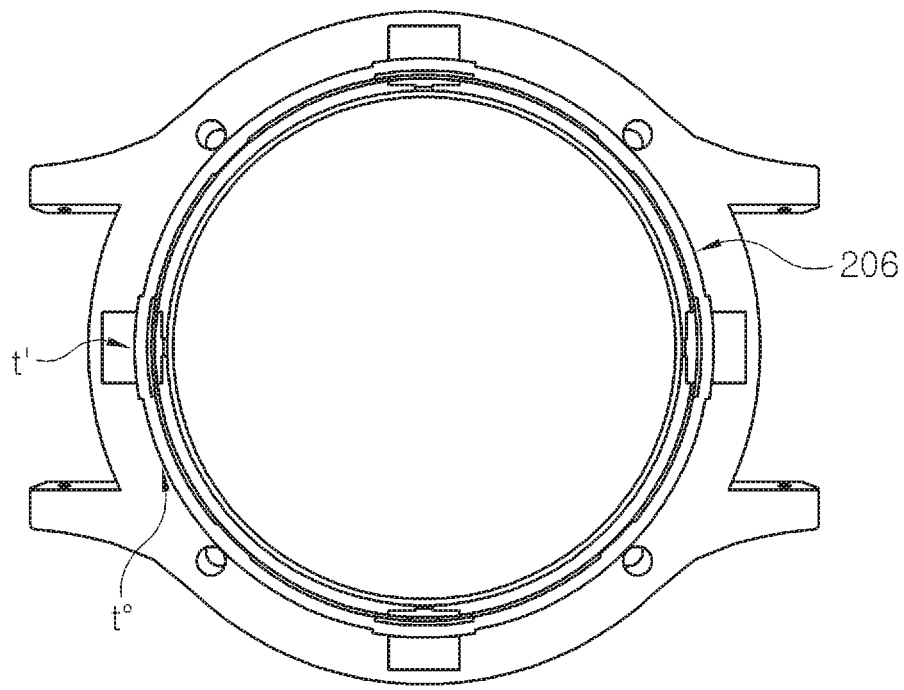
FIG. 4G illustrates a sensing interface of a wearable device according to an embodiment of the disclosure.

FIG. 4G illustrates a sensing interface of a wearable device according to an embodiment of the disclosure.

Referring to FIG. 4F, as a result of pushing the bezel 207, the air gap width t0 may change to the air gap width t'. In an example, due to the change of the air gap width, the capacitance value may also be changed based on Equation 1.

Figure 4H:
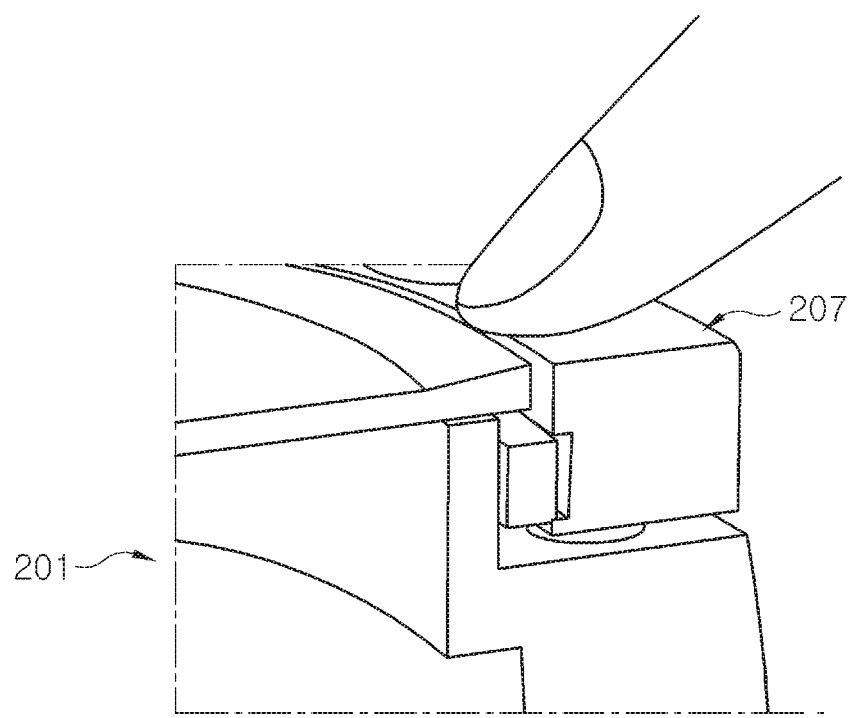
FIG. 4H illustrates a sensing interface of a wearable device according to an embodiment of the disclosure.

FIG. 4H illustrates a sensing interface of a wearable device according to an embodiment of the disclosure.

Referring to FIG. 4H, the user may touch both of the bezel 207 and the dial 204 of the watch-type electronic device 201. In the operation, changes of capacitance value may be detected.

Figure 4I:
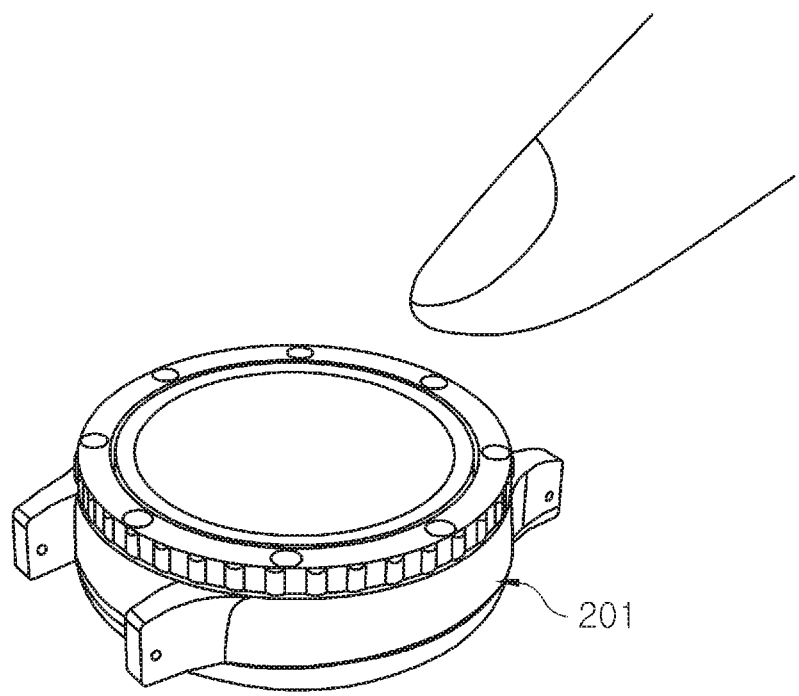
FIG. 4I illustrates a sensing interface of a wearable device according to an embodiment of the disclosure.

FIG. 4I illustrates a sensing interface of a wearable device according to an embodiment of the disclosure.

Referring to FIG. 4I, the user may hover fingertip over the bezel 207 of the watch-type electronic device 201. In the operation, the fingertip of the user may be located close to the bezel at a predetermined distance, thereby activating a predetermined operation of the watch-type electronic device 201. Based on the movement or hovering of the fingertip, changes of capacitance value may occur and in response the processor 110 may detect the changes of capacitance value. As a result, the detection of the changes of capacitance value may lead to perform a predetermined operation in the watch-type electronic device 201.

In another embodiment of the disclosure, the user may slide his fingertip over the bezel 207 of the watch-type electronic device 201. In the operation, in response to the sliding gesture of the user's fingertip, the changes of capacitance value may be detected. The varying capacitance values can be used to detect sliding action on the bezel 207. For example, when a variance of the capacitance value is detected, it may be determined that the user is sliding his fingertip over the bezel 207.

FIG. 4J illustrates components of a watch-type electronic device according to an embodiment of the disclosure.

Referring to FIG. 4J, the dial 204 of the watch-type electronic device 201 may have a certain region 2041 with different materials than other region of the dial 204. The capacitance value detected on the region 2041 may be different from the capacitance value of other regions due to the material differences. In an embodiment of the disclosure, the bezel 207 may also have four (4) segments with different materials, respectively. The bezel 207 has different materials, such as material 1 2071, material 2 2073, material 3 2075, and material 4 2077. Each of the materials has different conductivity which may lead to a different capacitance value for each segment corresponding to material 1 2071, material 2 2073, material 3 2075, and material 4 2077. Due to the different capacitance value, the device 201 may determine the location among the four segments on which the touch input is made.

Figure 4K:
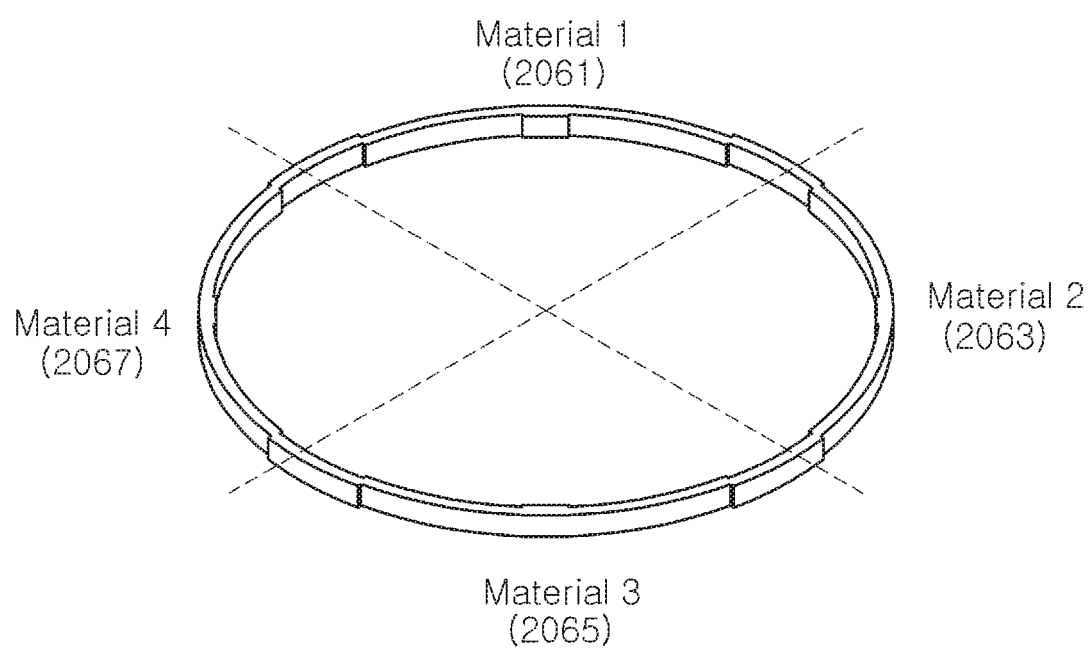
FIG. 4K illustrates an inner ring of a watch-type electronic device according to an embodiment of the disclosure.

FIG. 4K illustrates an inner ring of a watch-type electronic device according to an embodiment of the disclosure.

Referring to FIG. 4K, the inner ring 206 may be divided into four (4) segments and each of the segment is made of different materials, such as material 1 2061, material 2 2063, material 3 2065, and material 2067. In an embodiment of the disclosure, a bezel 207 may be divided into four (4) segments with the same material but each of the four segments of the bezel 207 is corresponding to the four segments of the inner ring 206. Although the user may not identify the location of the four segments of the inner ring 206 but may be able to identify via the location of the four segments of the bezel 207 exposed to the user. The capacitance value detected on each of the four segments of the bezel 207 may differ from each other due to the material differences of the four segments of the inner ring 206. Each of the four segments of the inner ring 206 has different permittivity which may lead to a different capacitance value. Due to the different capacitance value, the device 201 may determine the location among the four segments of the bezel 207 on which the touch input is made. Although the number of segments is four in the aforementioned embodiment of the disclosure, the number of segments may vary according to the manufacturer's choice.

In an embodiment of the disclosure, if the inner ring 206 has non-uniform shape as shown in FIG. 4F, the device 201 may determine the location of the touch input based on the non-uniform shaped inner ring because the non-uniform shaped inner ring 206 may bring about non-uniform permittivity and thus may lead to different capacitance value for the touch input on each region of the bezel 207. Not only the inner ring 206 but also the bezel 207 and/or the dial 204 may have non-uniform thickness to affect the capacitance value.

Figure 5A:
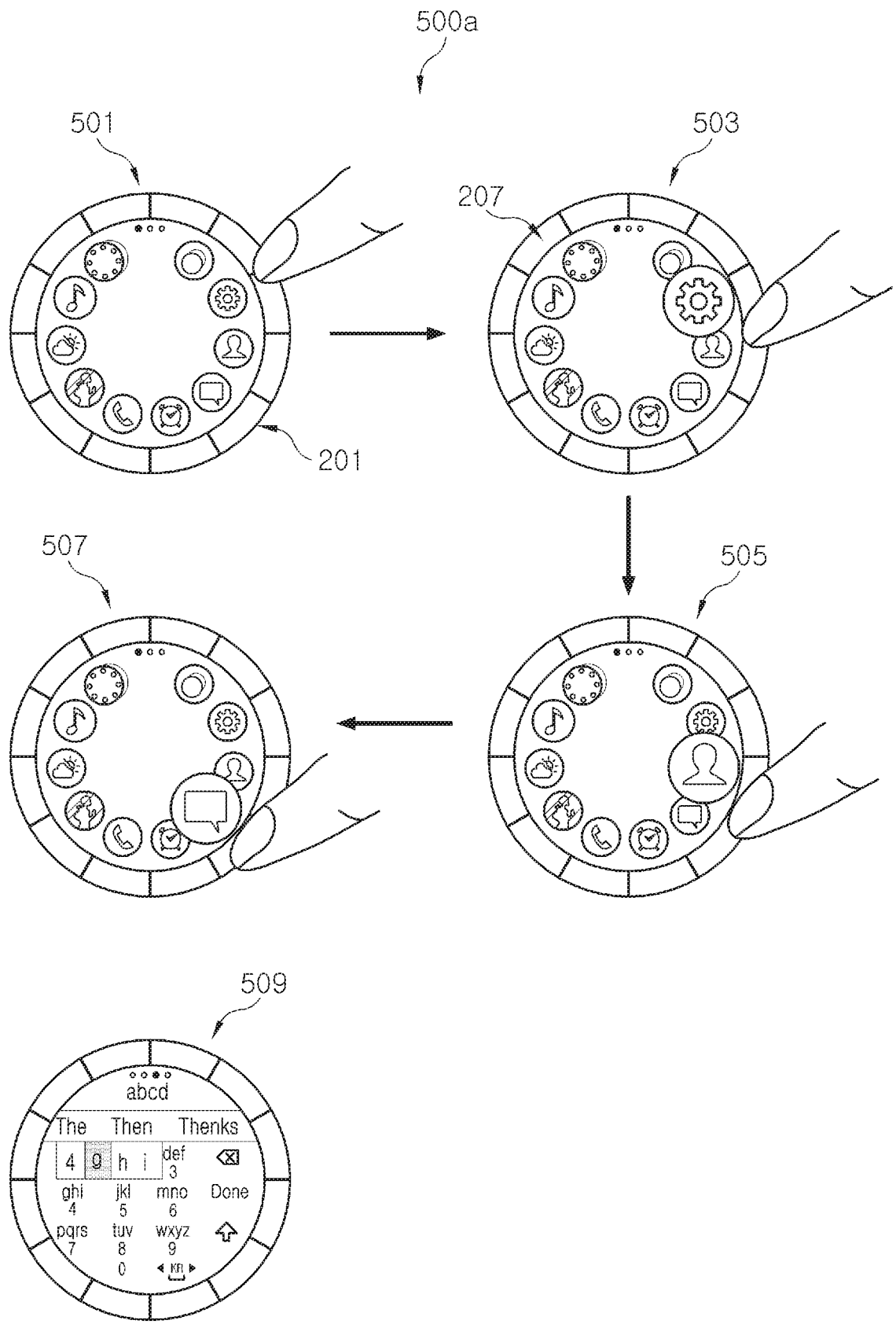
FIG. 5A illustrates various operations of a wearable device according to an embodiment of the disclosure.

FIG. 5A illustrates various operations of a wearable device according to an embodiment of the disclosure.

Referring to FIG. 5A, a first example operation 500a is shown. In operation 501, a plurality of applications of the watch-type electronic device 201 are displayed to the user. In operation 503, the user may place his finger on a first region of the bezel 207 and an application corresponding to the first region of the bezel may be identified by enlarging the icon of the application. If the user makes a slide gesture over the bezel 207, applications corresponding to the location of the finger on the bezel 207 may get highlighted or the icon of the applications may be enlarged in operation 505. When the user may stop the sliding gesture on a point on the bezel 207 corresponding to an application that he seeks to execute in operation 507. The user may tap or press the point on the bezel 207 to select and execute the application in operation 507. As a result, the main page of the selected application will be displayed for further operations to be performed by the user in operation 509.

FIG. 5B illustrates another operation of a wearable device according to an embodiment of the disclosure.

Referring to FIG. 5B, a second example operation 500b is shown. If the user touches the top of the bezel 207 in operation 511, a list of data presented in one application of the device 201 may scroll in an upward direction in operation 513. If the user touches the bottom of the bezel 207 in operation 515, a list of data presented in one application of the device 201 may scroll in a downward direction in operation 517 In an embodiment of the disclosure, if the user presses the top of the bezel 207, the list of data may be scroll upwardly faster.

Figure 5C:
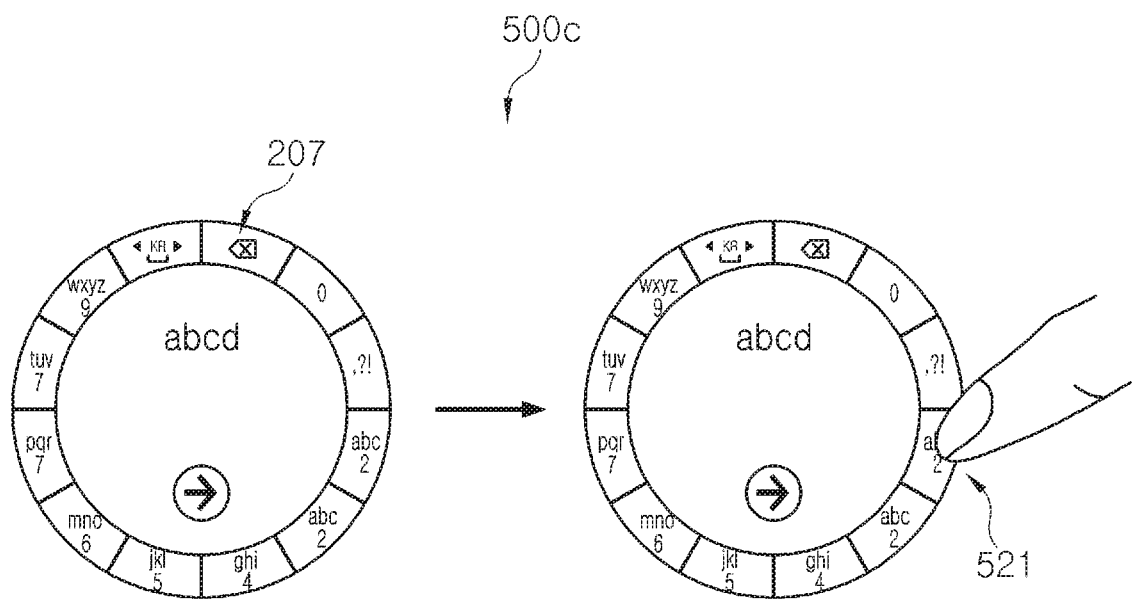
FIG. 5C illustrates another operation with a wearable device according to an embodiment of the disclosure.

FIG. 5C illustrates another operation of a wearable device according to an embodiment of the disclosure.

Referring to FIG. 5C, a third example operation 500c is shown. In an embodiment of the disclosure, a keyboard is engraved on the bezel 207 of the device 201. In operation 521, the user selects one character of the keyboard by touching the bezel 207.

Figure 5D:
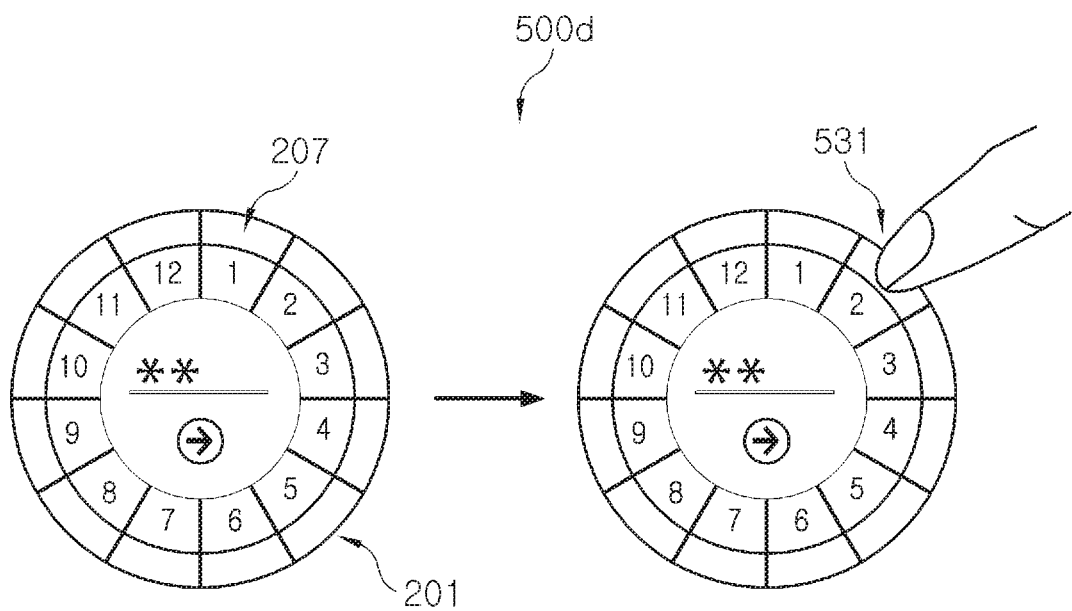
FIG. 5D illustrates another operation with a wearable device according to an embodiment of the disclosure.

FIG. 5D illustrates another operation of a wearable device according to an embodiment of the disclosure.

Referring to FIG. 5D, a fifth example operation 500d is shown. In an example operation, numeric characters are displayed along the periphery of the display of the device 201. For selection purpose, twelve (12) segments of the bezel 207 are divided and mapped to each of numeric characters, respectively. In operation 531, if the user touches one of the segments of the bezel 207, a corresponding mapped numeric character may be selected and inputted in an application. In an embodiment of the disclosure, not only the numeric characters but the alphabet characters may be displayed along the periphery of the display of the device 201 for the user to input characters in an application.

Figure 5E:
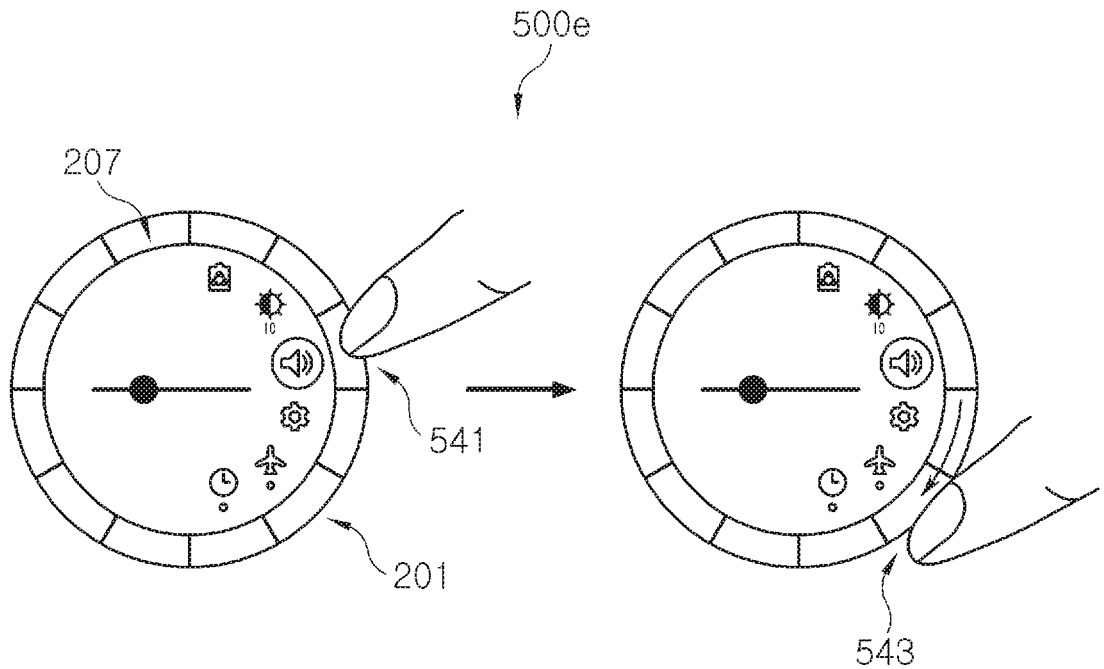
FIG. 5E illustrates another operation with a wearable device according to an embodiment of the disclosure.

FIG. 5E illustrates another operation of a wearable device according to an embodiment of the disclosure.

Referring to FIG. 5E, a sixth example operation 500e is shown. In an example, a plurality of applications are mapped to a plurality of segments of the bezel 207. In operation 541, if the user touches one segment of the bezel 207, the corresponding mapped application may be selected. After the selection of application, the user may make a slide gesture on the bezel 207 to change values applicable to the selected application in operation 543. For example, the user can press a segment of the bezel 207 mapped to the volume application. After the volume application is selected, the user slides downwards on the bezel 207 to reduce volume.

Figure 6:
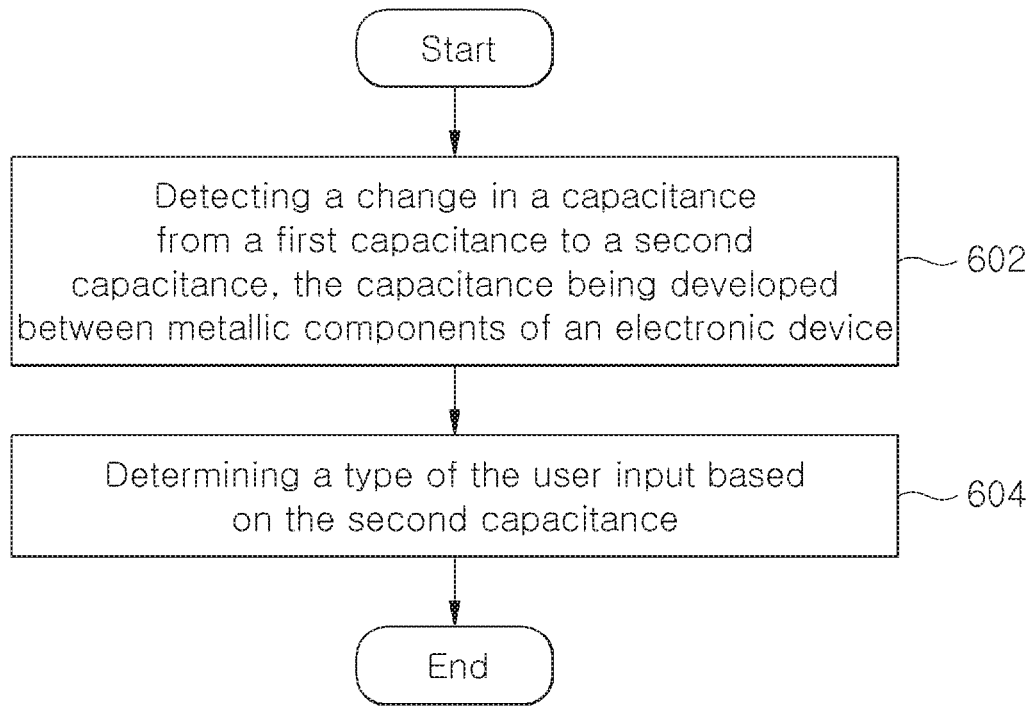
FIG. 6 illustrates a flowchart for determining a type of input received at a wearable device according to an embodiment of the disclosure.

FIG. 6 illustrates a method of determining a type of input received at a wearable device according to an embodiment of the disclosure.

Referring to FIG. 6, in operation 602, a change of the capacitance value generated at the capacitor formed by the bezel 207, the inner ring 206, and the dial 204 of the watch-type electronic device 201. In an example, the changes of the capacitance value may occur by a user input made on the first metallic component 102.

In operation 604, the watch-type electronic device 201 may determine a type of the user input based on the second capacitance. In an example, for determining the type of user input, a value of the second capacitance may be obtained by the processor 110. Thereafter, a length of a body part of a user providing the user input with respect to the first metallic component may be determined based on the second capacitance. Subsequently, the type of user input may be determined as one of a touch input, a hover input, and a push input based on the determined length of the body part.

Furthermore, in an example, the type of user input may be determined as a long press input when the distance between the body part and the first metallic component is constant for a predetermined time period.

Furthermore, the third component 106 of the electronic device 100 may be the inner ring 206 of the watch-type electronic device 201. The inner ring 206 may have asymmetric shape as illustrated referring to FIG. 4F. In an example, a location of the user input may be determined based on the second capacitance and a predetermined mapping between a plurality of capacitance values and a plurality of segments of the first metallic component.

Furthermore, in an example, the type of the user input may be determined as a slide gesture input when a continuous change in the location of the user input is determined.

Figure 7:
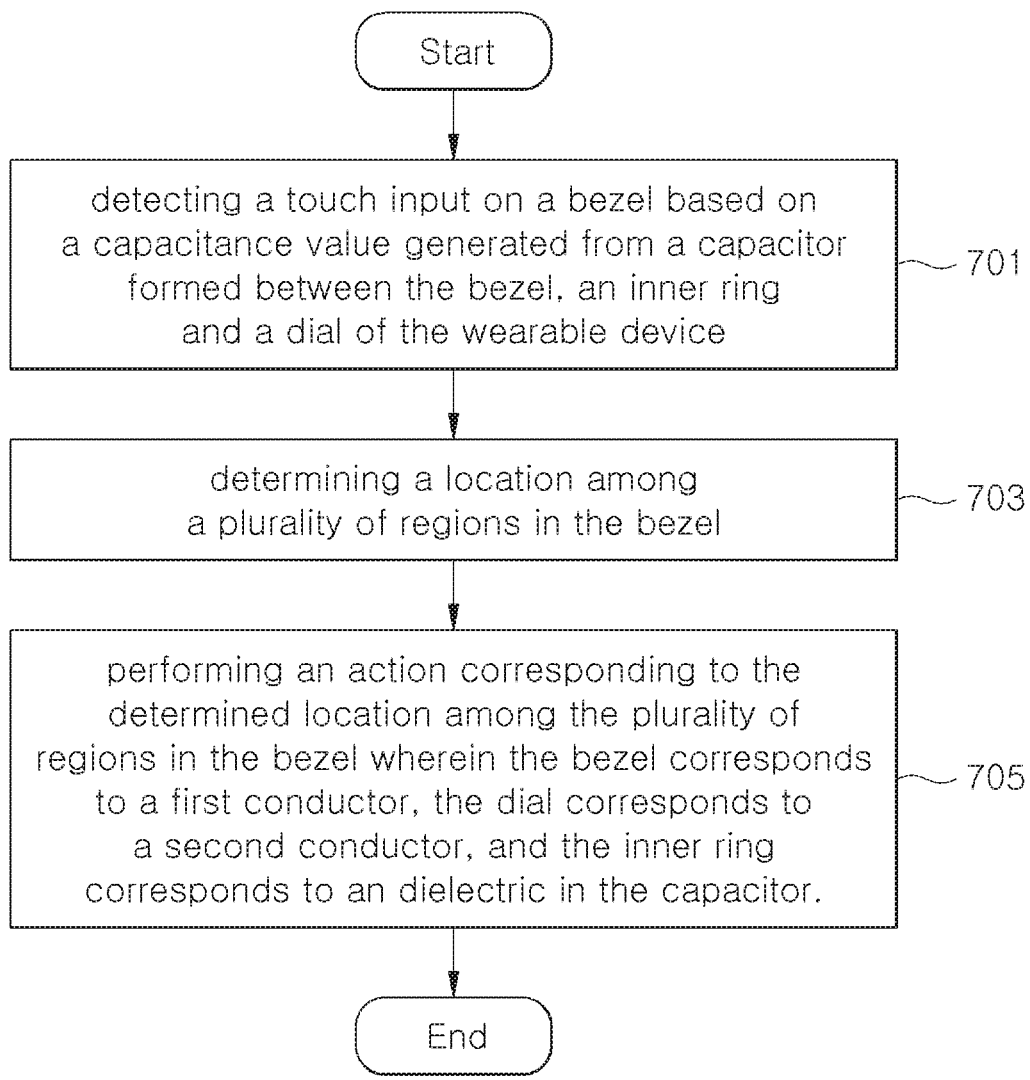
FIG. 7 illustrates a flowchart for detecting a touch input on a wearable device according to an embodiment of the disclosure.

FIG. 7 illustrates a flowchart for detecting a touch input on a wearable device according to an embodiment of the disclosure.

Referring to FIG. 7, in operation 701, a touch input made on a bezel 207 of a watch-type electronic device 201 may be detected based on a capacitance value generated from a capacitor formed between the bezel 207, the inner ring 206, and the dial 204 of the watch-type electronic device 201.

In operation 703, the processor may determine a location of the touch input among a plurality of regions distributed on the bezel 207. The location of the touch input may be determined based on non-uniform shape of the inner ring 206 and/or different materials assigned to a plurality of segments of at least one of the bezel 207, the dial 204, or the inner ring 206. In operation 705, the processor may perform a predetermined action corresponding to the determined location among the plurality of regions in the bezel 207. To form the capacitor, the bezel 207 may serve a first conductor, the dial 204 as a second conductor, and the inner ring 206 as a dielectric material.

Although the electronic device 100 is illustrated with a round-shaped watch device, the disclosure is not limited thereto. For example, a square-shaped wearable device, a rectangular-shaped wearable device, or an ellipse-shaped wearable device may also have the bezel, inner ring, and dial to form a capacitor therewith and thus perform the same operations or functions described throughout the disclosure in reference to the round-shaped smart watch device.

Figure 8:
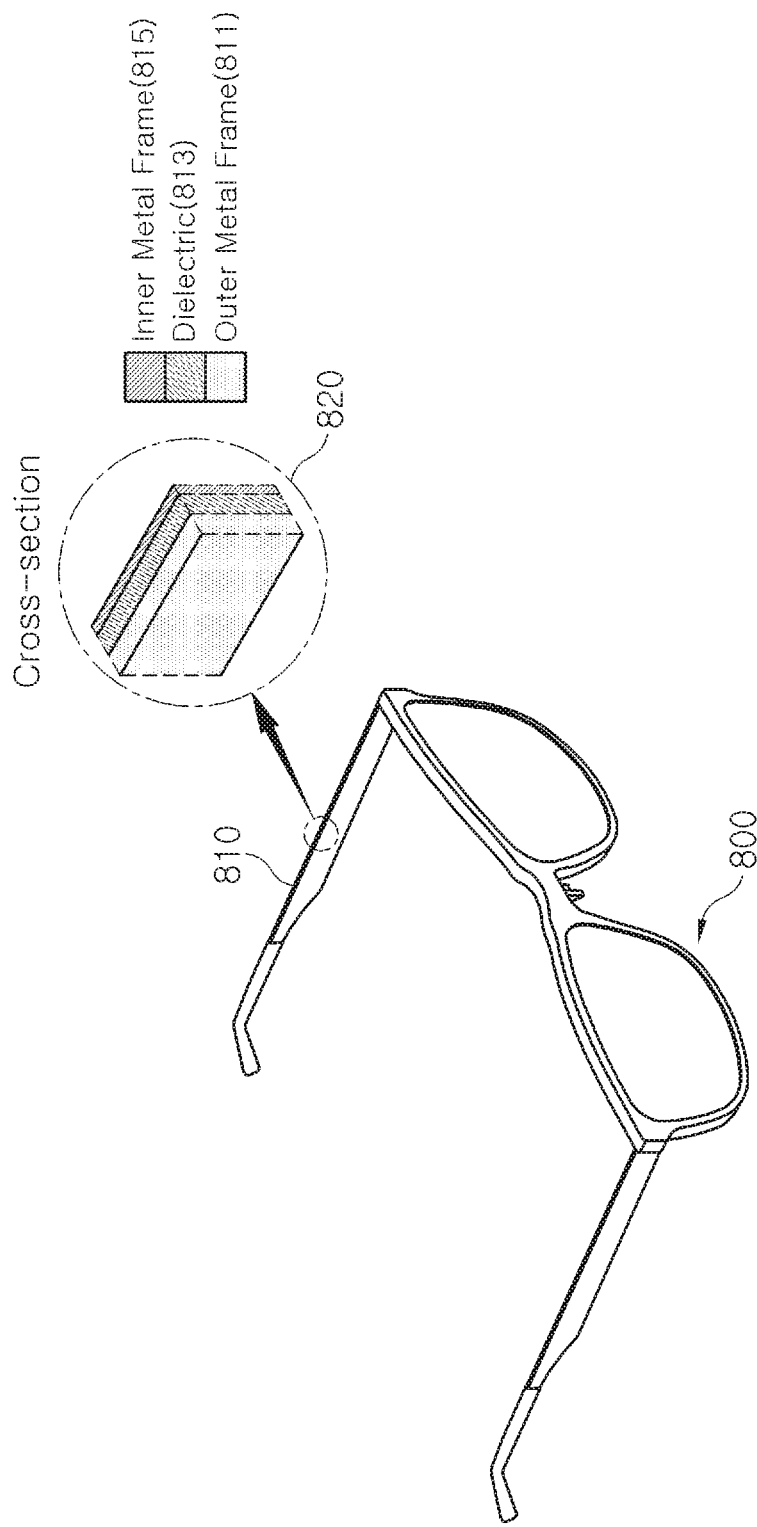
FIG. 8 illustrates smart glasses with a touch sensitive capacitor formed in a frame according to an embodiment of the disclosure.

FIG. 8 illustrates smart glasses with a touch sensitive capacitor formed in a frame according to an embodiment of the disclosure.

Referring to FIG. 8, the glass frame 810 of smart glasses 800 is made of metal. The cross-sectional view 820 of the glass frame 810 illustrates the outer metal frame 811, dielectric 813 and the inner metal frame 815 which constitute a capacitor configured to sense a touch input of a user. The thickness in at least one of the outer metal frame 811, dielectric 813 and the inner metal frame 815 may vary and thus the location of the touch input on the outer metal frame 811 may be determined based on the non-uniform thickness in at least one of the outer metal frame 811, dielectric 813 and the inner metal frame 815, and the change of the capacitance value derived from the non-uniform thickness. The outer metal frame 811 may be divided into a plurality of segments each of which may have different thickness in at least one of the outer metal frame 811, dielectric 813 and the inner metal frame 815. Each touch input on each of the segments may trigger different operations or different functions in the smart glasses 800.

The embodiments disclosed herein describe methods and systems for managing delivery of notifications for at least one missed or unexecuted event within an identified schedule. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written, for example, in Very High Speed Integrated Circuit Hardware Description Language (VHDL), another programming language, or implemented by one or more VHDL or several software modules being executed on at least one hardware device. The hardware device can be any kind of portable device that can be programmed. The device may also include means which could, for example, be hardware means, such as an application specific integrated circuit (ASIC), or a combination of hardware and software means, such an ASIC and a field programmable gate array (FPGA), or at least one microprocessor and at least one memory with software modules located therein. The method embodiments described herein could be implemented partly in hardware and partly in software. Alternatively, the disclosure may be implemented on different hardware devices, for example, by using a plurality of central processing units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
a first metallic component comprising a bezel;
a second metallic component comprising a housing, the housing forming a capacitor with the bezel;
an inner ring comprising a dielectric disposed between the bezel and the housing, wherein the inner ring comprises a plurality of segments each of which is made of different materials; and
at least one processor configured to obtain a capacitance value generated by a touch input on the bezel, and to determine a location of the touch input based on the plurality of segments of the inner ring.

2. The wearable device of claim 1,
wherein the wearable device comprises a watch-type electronic device, and
wherein the bezel, the housing, and the inner ring are round-shaped.

3. A wearable device comprising:
a first metallic component comprising a bezel;
a second metallic component comprising a housing, the housing forming a capacitor with the bezel;
an inner ring comprising a dielectric disposed between the bezel and the housing; and
at least one processor configured to obtain a capacitance value generated by a touch input on the bezel, and to determine a location of the touch input based on non-uniform thickness of at least one of the bezel, or the housing wherein the non-uniform thickness of the at least one of the bezel, or the housing generates different capacitance values in response to the touch input on the bezel.

4. The wearable device of claim 1, wherein the at least one processor is further configured to assign a function corresponding to the location of the touch input.

5. The wearable device of claim 1, wherein the bezel comprises a plurality of segments each of which corresponds to each of the plurality of segments of the inner ring.

6. The wearable device of claim 5, further comprising a display,
wherein the at least one processor is further configured to display, on the display, a plurality of applications, each application having a location corresponding to a location of a segment of the plurality of segments of the bezel.

7. The wearable device of claim 6, wherein the at least one processor is further configured to highlight an application among the plurality of applications in response to the touch input on a segment of the bezel which corresponds to the application.

8. The wearable device of claim 7, wherein the highlighting of the application comprises enlarging an icon of the application.

9. The wearable device of claim 7, wherein the at least one processor is further configured to execute the application based on a second touch input on the segment of the bezel corresponding to the application.

10. The wearable device of claim 5, wherein the at least one processor is further configured to control a scrolling operation with a list of data displayed on a display of the wearable device based on the touch input on a segment of the bezel.

11. The wearable device of claim 5, wherein each of the plurality of segments of the bezel comprises a numeric character or an alphabet character to be selected by the touch input on the bezel.

12. The wearable device of claim 11, wherein the at least one processor is further configured to display, on a display of the wearable device, the numeric character or the alphabet character based on the touch input on a corresponding segment of the bezel.

13. The wearable device of claim 1, wherein the bezel comprises a plurality of segments each of which comprises different materials.

14. The wearable device of claim 13, wherein the at least one processor is further configured to determine the location of the touch input based on the plurality of segments of the bezel.

15. The wearable device of claim 14, wherein the at least one processor is further configured to assign a function corresponding to the location of the touch input.

16. The wearable device of claim 1, wherein the bezel, the housing, and the inner ring are at least one of square-shaped, rectangular-shaped, or ellipse-shaped.

17. A method of detecting a touch input on a wearable device, the method comprising:
detecting a touch input on a bezel based on a capacitance value generated from a capacitor formed between the bezel, an inner ring and a housing of the wearable device;

determining a location of the touch input among a plurality of regions in the bezel based on a plurality of segments of the inner ring each of which is made of different materials; and performing an action corresponding to the determined location among the plurality of regions in the bezel, wherein the bezel corresponds to a first conductor, the housing comprises a second conductor, and the inner ring corresponds to a dielectric in the capacitor.

* * * * *